United States Patent [19]

Andrews

[11] 4,081,221
[45] Mar. 28, 1978

[54] TRIPOD BLADED WIND TURBINE

[75] Inventor: Merritt B. Andrews, Westfield, Mass.

[73] Assignee: United Technologies Corporation, Hartford, Conn.

[21] Appl. No.: 751,580

[22] Filed: Dec. 17, 1976

[51] Int. Cl.² .............................................. F03D 1/06
[52] U.S. Cl. .............................. 416/227 A; 416/193 R
[58] Field of Search .............. 416/227 A, 193 R, 194, 416/200 R

[56] References Cited

U.S. PATENT DOCUMENTS

| | | | |
|---|---|---|---|
| 1,098,306 | 5/1914 | Trautmann et al. | 416/227 A X |
| 1,780,431 | 11/1930 | McCarroll | 416/227 A X |
| 1,820,529 | 8/1931 | Darrieus | 416/227 A X |
| 1,886,891 | 11/1932 | Martens et al. | 416/227 A X |

*Primary Examiner*—Everette A. Powell, Jr.
*Attorney, Agent, or Firm*—Charles A. Warren

[57] ABSTRACT

A wind turbine rotor in which the hub supports several bases spaced from each other around the hub, with all said bases mounted for turning movement about axes radial to the axis of the rotor, and with each base supporting a plurality of thin elongated vanes, each being airfoil shape in section with the several vanes on each base having the chords of their airfoils substantially parallel to one another. The vanes are mounted on the base in spaced relation to one another and substantially radial to the axis of the rotor and are interconnected at or near their outer ends.

12 Claims, 11 Drawing Figures

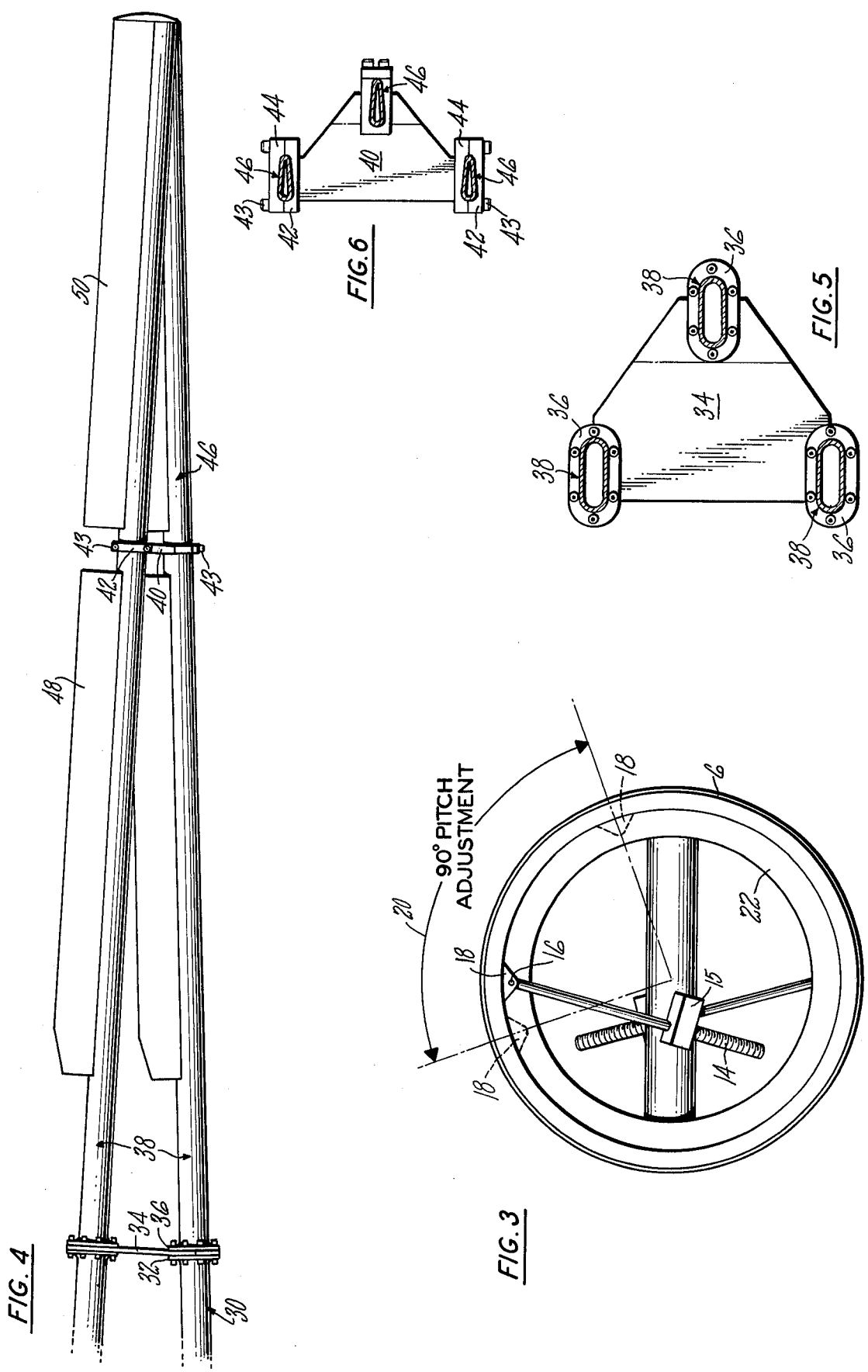

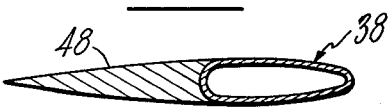
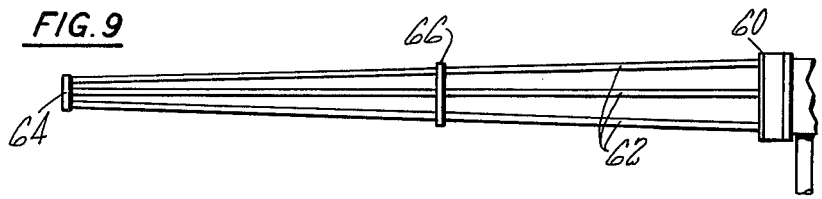
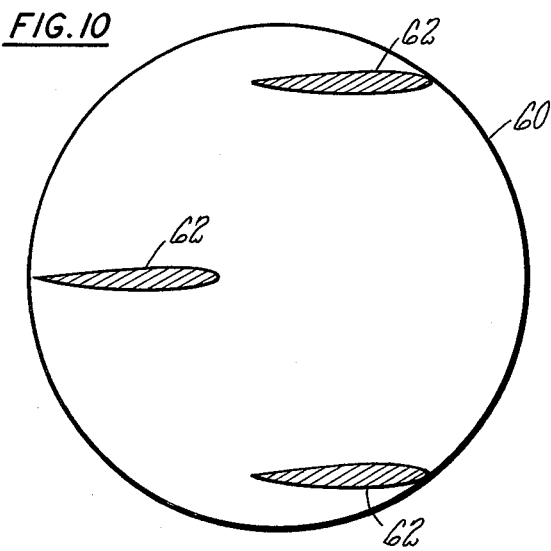
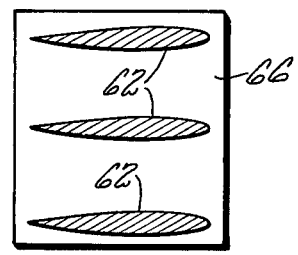

4,081,221

TRIPOD BLADED WIND TURBINE

BACKGROUND OF THE INVENTION

Wind turbines are being developed with large diameter rotors, for example, 200 feet or more, so that each blade may be as much as 100 feet long. Such blades are desirably as light as possible in order to minimize the structure required to support them in operation but also low in cost in order to minimize the installation cost. Since these turbines are located in windy areas and spin on horizontal axes, and the supporting structure must permit the turbine rotor to turn on a vertical axis into the wind, the weight and simplicity of the rotor structure is of greatest importance. Low cost and lightweight blades of adequate stability are thus one of the significant areas for development.

SUMMARY OF THE INVENTION

The principal feature of the invention is a blade that is extremely lightweight and also low in cost and with the necessary stability to withstand the wind pressures and other loads thereon. Another feature is a blade made up of a plurality of elongated vanes attached to a base at the rotor hub in spaced relation to one another and connected together at their outer ends in pyramidal form. Another feature is the contouring of at least part of these vanes to an airfoil section and with the several vanes having the chords of the airfoil sections substantially parallel to one another. Another feature is the angular adjustment of the several blade bases simultaneously in repositioning the blades to adjust for wind changes.

According to the invention the rotor has a hub with a plurality of bases spaced about the hub and mounted to move simultaneously on axes radial to the hub. Each base carries a number of vanes, preferably three, extending substantially radially of the hub and with their outer ends connected together. The attachments to the base are in spaced relation to one another and at least the most effective portion of each vane is airfoil in section, with the chords of the airfoils on the several vanes on any one base being substantially parallel to one another.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 3 is a view at right angles to FIG. 2 substantially along the line 3—3 of FIG. 2.

FIG. 4 is an enlarged view of the blades taken along the line 4—4 of FIG. 1.

FIG. 5 is a sectional view along line 5—5 of FIG. 1.

FIG. 6 is a sectional view along line 6—6 of FIG. 1.

FIG. 7 is a sectional view along line 7—7 of FIG. 1.

FIG. 8 is a sectional view along line 8—8 of FIG. 1.

FIG. 9 is a view similar to FIG. 1 of a modification.

FIG. 10 is a sectional view similar to FIG. 5 of a simplified blade.

FIG. 11 is a view similar to FIG. 6 showing the simplified construction of FIG. 9.

DESCRIPTION OF THE PREFERRED EMBODIMENT

Figure 1:
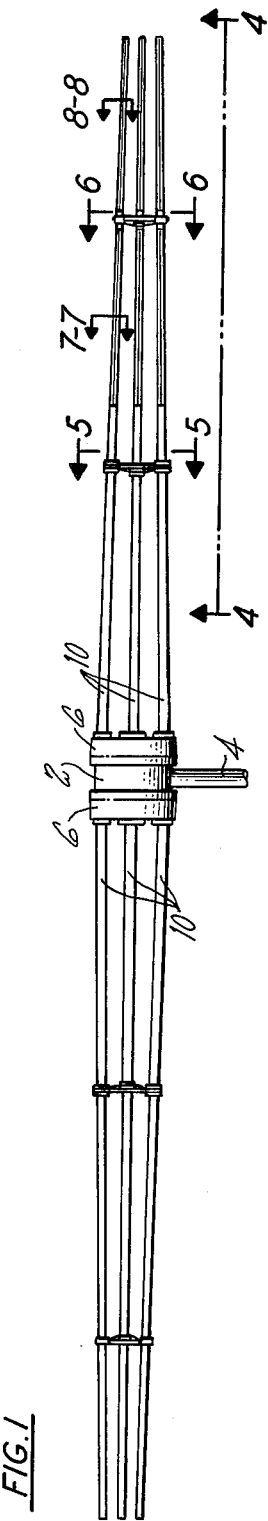
FIG. 1 is an elevation of the rotor of the invention.
Figure 2:
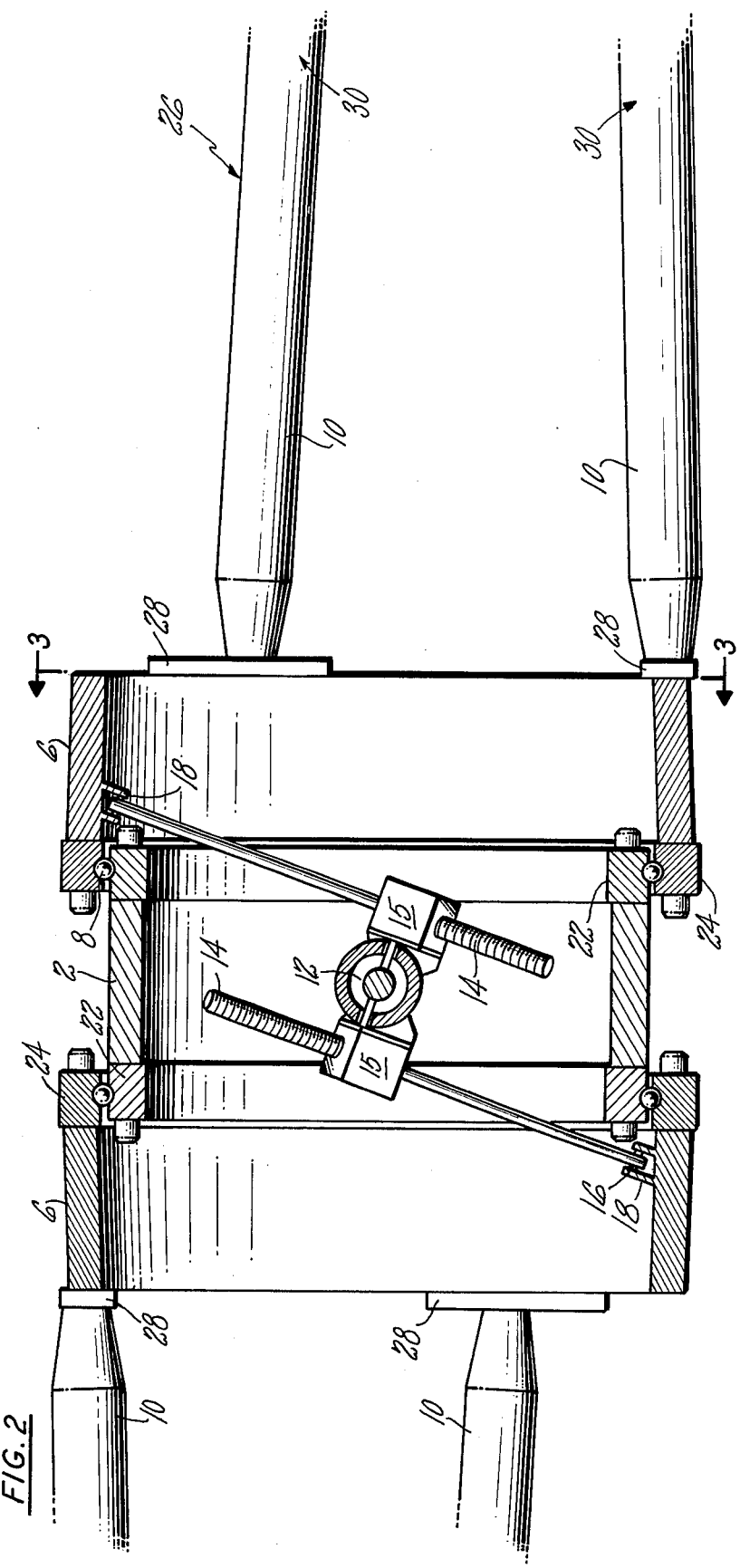
FIG. 2 is an enlarged elevation of the hub and actuating mechanism.

The wind turbine shown is adapted for mounting on a tower and is preferably supported on the tower so that the turbine may turn on a vertical axis to position the horizontal axis of the turbine parallel to the wind direction. The turbine includes a hub 2 having a projecting shaft 4 by which the hub is supported for rotation on a horizontal axis. The hub 2 supports a plurality of blade bases 6, two in the arrangement shown, and each base is mounted on the hub so that it may be turned on an axis radial to the axis of rotation of the hub. To effect this, the base carries spaced parallel bearings 8, FIG. 2, by which the bases are supported on the hub.

These bases are turnable to position the blades 10 carried by the bases in proper relation to the wind flow to obtain best performance. To this end, the hub 2 supports a gear box 12 driving two threaded rods 14 through nuts, not shown, within blocks 15 on the gear box. These rods 14 are connected by pins 16 to brackets 18, FIG. 3, on the respective bases and as will be apparent from FIG. 3 the movements of the rods through the blocks 15 will turn the bases to any selected point within the angle 20 for pitch adjustment of the blades. Both bases will be turned through the same angle simultaneously.

For lightweight, low cost construction the hub may be essentially a cylinder, as shown, with the projecting shaft thereon, and the bases may be short sleeves also as shown. The inner and outer races 22 and 24 for the bearings 8 are bolted, respectively, to the hub and to the bases as shown.

Each blade structure for the turbine is made up of the base 6 to which are attached a plurality of vanes 26 extending outwardly from the base in a direction substantially parallel to the turning axis of the base and thus substantially radially of the hub. Each vane 26, preferably three on each base, is made up of low-cost extrusions and is attached thereto by a plate 28 integrally secured to the inner end of the vane. Each vane has an inboard element 30, preferably hollow and desirably somewhat streamlined as shown in FIG. 4. The inboard element carries at its outer end a mounting plate 32. The plates 32 on the several inboard elements 30 are bolted to a part span shroud 34 as shown. Although the vanes extend in generally radially of the hub, the several vanes converge toward one another from base to tip and, to this end the shourd 34 is smaller than the base 6 as shown.

Bolted to the outer side of the shroud 34 are the inner end plates 36 on intermediate vane elements 38 extending outwardly from the shroud 34 and also converging toward one another to a second part span shroud 40, FIG. 6. The intermediate elements 38 carry outer end plates 42 which are held by bolts 43 to the shroud 40 and these bolts also serve to attach the inner plates 44 of the outboard vane elements 46. The outboard elements 46 converge toward one another toward the tips and the construction is such that the three elements making up each vane are straight from end to end.

The intermediate elements 38 have trailing edge sections 48 secured thereto for the greater portion of their length and are shaped to form relatively thin airfoil sections for this part of the vane. Also, the outboard elements 46 have trailing edge sections 50 secured thereto for substantially the entire length to form thin airfoil sections for the vane. Thus, for the major portion of its length, in the most effective part of the blade, the sections are low thickness-ratio airfoils to act efficiently as the wind blows over the vanes when the turbine is in operation.

As shown in FIG. 5, the chords of these airfoil sections are essentially parallel to one another and, with each blade in highest pitch, the chords are substantially in a radial plane at right angles to the hub axis. Movement of the bases on their radial axes will move the three vanes in unison and will increase the angle that these chords make with the radial plane thereby adjusting the blade with respect to the wind velocity for best performance.

Where the generator driven by the turbine delivers power compatible with commercial sources the pitch change for the blades will permit maintenance of the torque limits.

The three-piece blades are such that the blade elements may be assembled into the complete blades at the site. In this way there are no significant limitations to the size, particularly the lengths of the blades.

The structure above described is adapted for large installations and the multipiece vanes permit easier transport from the place of manufacture to the turbine installation. A simpler blade structure is shown in FIGS. 9, 10, and 11. In this structure the base 60, comparable to the base 6, has a plurality of vanes 62, preferably three, mounted thereon. These vanes extend out substantially radially of the hub and are airfoil in section throughout their length. The vanes are attached to the base so that their chords are parallel to one another, and at the high pitch position of the base 60 are substantially parallel to a radial plane perpendicular to the hub axis. As shown in FIG. 10, the three vanes are spaced apart around the periphery of the base so that the middle vane is offset from the two outer vanes in a direction parallel to the chords of the vanes, and each vane is spaced from the other vanes at the attachment to the base. Thus the outer two vanes are spaced apart in a direction perpendicular to the chords. These vanes converge toward the tip almost to a point and are held in side by side relation at the tip by a tip shroud 64. The three vanes thus form a tripod structure that provides an adequate strength for the blade. This tripod effect permits, as will be apparent, relatively thin blade sections since the offseting of the bases makes a much more rigid structure than if the bases were in line with one another. The vanes are in effect spaced apart both axially and circumferentially of the hub on which the supporting base is mounted. A part span shroud 66 may be positioned near the midposition of the vanes if such a shroud appears necessary. Obviously, this is a simpler structure than that above described but may be adequate where cost is a factor or where size permits the use of such a construction. Although the tip shroud is shown at the outer ends of the vanes, it may be adjacent to but spaced from the tip. Whether the shroud is at or spaced from the tip it is, in either event, near enough to the tip to provide the desired interconnecting structure for the vanes.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the U.S. is:

1. A blade for a wind turbine comprising:
   a base for mounting for turning on a hub on an axis radial to the hub,
   at least three elongated airfoil shaped vanes connected at their inner ends to said base in spaced relation to one another and to the turning axis of the base, and with one of the vanes offset from the others in a direction parallel to the vane chords, said vanes converging toward the tips, and
   shroud means connecting the vanes together with the vane chords parallel in closely spaced relation near the outer end to produce a tripod effect for the blade.

2. A blade as in claim 1 in which part span shrouds interconnect the several vanes.

3. A wind turbine rotor including:
   a hub,
   a plurality of bases spaced around the hub and each mounted for turning movement on an axis radially of the hub,
   each base supporting at least three elongated streamlined vanes extending substantially radially therefrom, the several vanes being connected to the base in spaced relation to one another about the periphery of the base and all the vanes being in spaced relation to the turning axis of the base, and
   shroud means at or near the tip for connecting the outer ends of the vanes in closely spaced relation to one another, thereby forming a tripod effect for the vanes on the base.

4. A rotor as in claim 3 in which a major portion of the vanes are airfoil shape in section and the several vanes on each base have the chords of the airfoils substantially parallel to one another.

5. A rotor as in claim 3 including means for turning all said bases simultaneously through equal amounts.

6. A rotor as in claim 4 in which the airfoil sections are positioned on the base so as to make a small angle with a plane perpendicular to the axis of rotation of the hub.

7. A rotor as in claim 3 in which each vane has a plurality of end to end elements, the outer of which are airfoil in cross section.

8. A rotor as in claim 7 in which the end to end elements are removably secured together.

9. A blade for a wind turbine including:
   a base for mounting on a hub,
   at least three elongated vanes extending from said base, the ends of the vanes being located on the base in spaced relation to one another about the periphery of the base and said vanes converging toward their tips, each vane being made up of a pluraity of segments removably attached to each other in end to end relation and in which a major portion of the length of each vane is airfoil in cross section, and
   shroud elements connecting said vanes together near their tips.

10. A blade as in claim 9 in which a removable part span shroud interconnects the several vanes at the attachment of the outer segment of each vane to the next adjacent segment.

11. A blade as in claim 9 in which a part span shroud interconnects the several vanes at the attachment of each segment of each vane to the next adjacent segment.

12. A blade as in claim 11 in which the part span shrouds form a part of the vane attachments.

* * * * *